United States Patent [19]

Van Heteren et al.

[11] Patent Number: 5,190,781
[45] Date of Patent: Mar. 2, 1993

[54] SPOONABLE NON-DAIRY CREAMS

[75] Inventors: Jan Van Heteren, Hinchley Wood; David M. King, Willaston; Evelyn M. Moriarty, Hornchurch, all of England

[73] Assignee: Van den Bergh Foods Co., Division of Conopco, Inc., Lisle, Ill.

[21] Appl. No.: 783,283

[22] Filed: Oct. 28, 1991

[30] Foreign Application Priority Data

Oct. 29, 1990 [EP] European Pat. Off. ........ 90202863.8

[51] Int. Cl.$^5$ ............................................. A23L 1/19
[52] U.S. Cl. .................................... 426/521; 426/519; 426/570; 426/602
[58] Field of Search ............... 426/564, 570, 602, 519, 426/521

[56] References Cited

U.S. PATENT DOCUMENTS 3,903,310  9/1975  Buide et al. ..................... 426/564
3,968,267  7/1976  Ogasa et al. .

FOREIGN PATENT DOCUMENTS 294119  12/1988  European Pat. Off. .
354356   2/1990  European Pat. Off. .
1173827 10/1969  United Kingdom .

Primary Examiner—Donald E. Czaja
Assistant Examiner—Evan Federman
Attorney, Agent, or Firm—A. Kate Huffman

[57] ABSTRACT

The invention is concerned with water-continuous non-dairy creams (NDC) with 20–50 wt. % of fat and optionally thickeners and emulsifiers. These NDC's are stable and spoonable and display preferably Stevens values of 10–500 g.

2 Claims, No Drawings

SPOONABLE NON-DAIRY CREAMS

BACKGROUND OF THE INVENTION

Spoonable dairy creams are very well known in Great Britain. They are often used in desserts or with cakes. The requirements that spoonable creams should fulfil at 5° C. are described by P. Sherman in Emulsion Science, Ac. Press 1968, in terms of rheology. These requirements are:

1) the creams should have an extrapolated yield value of more than 50 Pa between shear rates of 100-300 $S^{-1}$ (Bingham);

2) the creams should have a Bingham viscosity of less than 500 mPa s between shear rates of 100-300 $S^{-1}$;

3) the creams should display failure to stress at a strain of less than 0.5 Radians.

Furthermore, the creams should be stable, i.e. no separation should occur when storing these creams over a relatively long period. It should be noted that failure to stress is defined as that point in the strain curve of an emulsion wherein the storage modulus (G') equals the loss modulus (G"). Although dairy creams are known that are spoonable, the stability of dairy creams is still a problem when using longer storage times. It is also for the purpose of obtaining more healthier products, i.e. products containing more unsaturated or at least fewer saturated fatty acid moieties, that attempts have been made to produce a non-dairy equivalent of the spoonable dairy creams. However, so far any efforts to produce a spoonable non-dairy cream (=NDC), thus one containing non-dairy fats, have been unsuccessful: Either the stability or the rheology of the creams was insufficient.

Therefore, so far no non-dairy equivalent of a spoonable dairy cream was available.

DESCRIPTION OF PREFERRED EMBODIMENTS

We have now found a solution to the problems mentioned above. Therefore, our invention is concerned in the first place with water-continuous, non-dairy creams that contain emulsifiers and 20-50 wt. % of fat, and optionally thickeners, which NDC's are characterized in that they are stable and spoonable. In this respect, the term stable is defined as : the cream can be stored for at least 14 days at a temperature of 1°-15° C. without the consumer noticing any chemical and/or physical changes. The term spoonable is defined here in accordance with the definition of spoonable given above, as disclosed in Sherman.

Suitable spoonable NDC's display a firmness, measured as Stevens value, of 10-500 g. Stevens value can be measured with an LFRA-Stevens texture analyzer, using a cylindrical measuring rod having a diameter of 2.5 cm, a height of 3.5 cm and a weight of 20.9 g and 0.4 mm penetration depth.

The fats that can be used in our NDC's are all vegetable fats. Preferred fats are, however, palmkernel oil, soybean oil, rapeseed oil, coconut oil, sunflower oil, safflower oil and/or fully or partially hardened fractions thereof. The fat compositions can also contain butterfat; in general, 0-40 wt. %, preferably 20-30 wt. % of the total fat can consist of butterfat.

The most preferred fat mixtures consist of a mixture of sunflower oil and hardened soybean oil, preferably in a weight ratio of 3-5 sunflower oil to 1 partially hardened soybean oil, and of a mixture of hardened palmkernel oil, coconut oil and butterfat, preferably in a weight ratio of 1-3 palmkernel oil to 1-3 coconut oil to 1 butterfat.

In order to obtain stable, spoonable NDC's, it is important to use an emulsifier. Emulsifiers that give the best results are monoglyceride esters of saturated fatty acids, in particular those derived from fatty acids having 16-18 C-atoms (=Hymono's). Tweens, i.e. polyoxyethylene sorbitan fatty acid esters, however, also lead to good results.

The emulsifiers are present in amounts of 0.05-0.8 wt. %, preferably 0.1-0.5 wt. %.

Thickeners can also be present in our NDC compositions. Although all known types of thickeners can be used, e.g. locust bean gum, guar gum, alginate, carrageenan, microcrystalline cellulose, we prefer to use guar gum. The amount of thickener is normally between 0.01 and 0.5 wt. %, preferably 0.05-0.3 wt. %.

The taste of NDC is rather flat. In order to improve the taste and to give it a dairy impression, 1-10 wt. %, preferably 5-8 wt. % of a milk protein source such as skimmed milk powder, sodium caseinate, a whey powder concentrate or, preferably, buttermilk powder (BMP) can be added to the water phase of the NDC. The presence of these amounts of buttermilk powder in the NDC's does not influence the other, required properties of our NDC's in an unacceptable way.

The invention is further concerned with a process for the production of spoonable, stable NDC's. This process comprises the following steps:

making a pre-mix of the fats, emulsifier, thickener and water and optionally buttermilk powder;

heating the pre-mix to 70°-90° C.;

sterilizing the heated pre-mix by UHT treatment, i.e. by introducing steam of 130°-160° C. for 1-30 seconds;

cooling the sterilized pre-mix to 40°-60° C.;

homogenizing the cooled pre-mix under pressure, either in a single stage or in a multi-stage process. Pressures that can be applied range from 50-250 bar, preferably 150-225 bar;

cooling the homogenized mixture to 25°-40° C.;

filling a container, e.g. a tetrapack, with the cooled, homogenized, spoonable NDC at 25°-40° C.

The filled containers should be further cooled to 5° C. in the warehouse.

In this way NDC's are obtained that are spoonable and stable for relatively long periods of time.

EXAMPLE I

A pre-mix was made of the components mentioned in Table I.

TABLE I

| Component | amount in wt. % |
| --- | --- |
| Hardened palmkernel oil | 13.5 |
| Coconut oil | 13.5 |
| Butter | 7.5 |
| Hymono ($C_{16}/C_{18}$ monoglycerides) | 0.2 |
| BMP (Butter Milk Powder) | 7.0 |
| Thickener | 0.07 |
| Water | balance to 100% |

This pre-mix was heated to 80° C., sterilized by steam injection (150° C., 2.5 sec.) and cooled to 50° C. The water-continuous emulsion was now pressurized in a single stage, using a pressure of 200 bar. After the pressurization, the NDC was cooled to 40° C., after which it was packed at the same temperature in a tetrapack and stored at 5° C.

The Stevens value of this NDC at 5° C. was 40 g. The NDC was eminently spoonable. The NDC was stable for at least 21 days.

EXAMPLE II

The procedure of Example I was repeated, but using the composition of Table II.

TABLE II

| Component | amount in wt. % |
| --- | --- |
| Sunflower oil | 24 |
| Hardened soybean oil m.p. 44° C. | 6 |
| Hymono | 0.2 |
| BMP | 7.0 |
| Thickener | 0.07 |
| Water | balance to 100% |

The composition was stable for at least 21 days, while the Stevens value was 30 g.

EXAMPLE III

The process was repeated with a composition according to Example I, the only exception being that the Hymono was replaced by 0.35 wt. % of Tween-60 (=polyoxyethylene sorbitan fatty acid esters).

After filling, the product was slowly cooled to 5° C., resulting in a spoonable product.

We claim:

1. A process for the preparation of a spoonable stable non-dairy cream comprising the steps of:
    (a) admixing a fat, an emulsifier, a thickener, 0.1 to 10 wt. % of a buttermilk powder and water to form a premix;
    (b) heating the premix to a temperature of 70° to 90° C. to form a heated premix;
    (c) sterilizing the heated premix by injection of steam having a temperature of 130° to 160° C. for 1 to 30 seconds to form a sterilized premix;
    (d) cooling the sterilized premix to 40° to 60° C. to form a cooled premix;
    (e) homogenizing the cooled premix under pressure to form a homogenized mixture;
    (f) cooling the homogenized mixture to 25° to 40° to form a cooled homogenized mixture; and
    (g) filling a container with the cooled homogenized mixture at 25° to 40° C. to form a spoonable non-dairy cream, wherein the non-dairy cream is storable for at least 14 days at a temperature of 1° to 15° C. without noticeable chemical or physical changes.

2. Process according to claim 1, wherein the pressure, applied in the homogenization step, is 50–250 bar.

* * * * *